US012656220B2

(12) United States Patent
Guo et al.

(10) Patent No.: US 12,656,220 B2
(45) Date of Patent: Jun. 16, 2026

(54) PERFORMANCE TESTING DEVICE FOR PISTON ROD SEALING ASSEMBLY

(71) Applicant: Tsinghua University, Beijing (CN)

(72) Inventors: Fei Guo, Beijing (CN); Chong Xiang, Beijing (CN); Yijie Huang, Beijing (CN); Fan Zhang, Beijing (CN); Yu Tian, Beijing (CN); Yuming Wang, Beijing (CN)

(73) Assignee: Tsinghua University, Beijing (CN)

( * ) Notice: Subject to any disclaimer, the term of this patent is extended or adjusted under 35 U.S.C. 154(b) by 346 days.

(21) Appl. No.: 18/463,472

(22) Filed: Sep. 8, 2023

(65) Prior Publication Data

US 2024/0418603 A1     Dec. 19, 2024

(30) Foreign Application Priority Data

Jun. 16, 2023     (CN) .......................... 202310722409.3

(51) Int. Cl.
G01M 13/005         (2019.01)
F15B 19/00          (2006.01)
G01M 3/16           (2006.01)

(52) U.S. Cl.
CPC ............ G01M 13/005 (2013.01); G01M 3/16 (2013.01); *F15B 19/00* (2013.01)

(58) Field of Classification Search
CPC ...... G01M 13/005; G01M 3/16; G01M 3/002; G01M 3/025; G01M 3/2869; G01M 3/04; G01M 7/022; G01M 7/025; G01M 7/027; F15B 19/00; F15B 15/1461; Y02E 30/30
See application file for complete search history.

(56) References Cited

U.S. PATENT DOCUMENTS

2021/0325297 A1*  10/2021  Guo .................... G01M 13/005

FOREIGN PATENT DOCUMENTS

| CN | 105673621 | A | * | 6/2016 | ............ F15B 19/007 |
| CN | 109540497 | A | * | 3/2019 | ............ G01M 13/00 |
| CN | 208721348 | U |  | 4/2019 | |
| CN | 110285860 | A | * | 9/2019 | .............. G01F 1/38 |
| CN | 111256995 | A | * | 6/2020 | .......... G01M 13/045 |
| CN | 113418684 | A | * | 9/2021 | ............ G01N 33/00 |
| CN | 214304652 | U |  | 9/2021 | |

(Continued)

*Primary Examiner* — Fatemeh Esfandiari Nia
(74) *Attorney, Agent, or Firm* — Tucker Ellis LLP

(57)                    ABSTRACT

A performance testing device for the piston rod sealing assembly includes a bracket, a support apparatus, a drive apparatus and a leakage detection apparatus, where the support apparatus includes a cylinder body that is internally provided with a movable channel, and the movable channel is configured to allow a piston rod equipped with a sealing component to pass therethrough; the drive apparatus is provided on the bracket and configured to be connected with the piston rod; the leakage detection apparatus includes a limit member and an oil receiver, the limit member is provided with a detection channel and an oil channel and connected to the cylinder body, the detection channel is communicated with the movable channel and configured to allow the piston rod to pass therethrough; one end of the oil channels is communicated with the detection channel and the other end thereof is communicated with the oil receiver.

20 Claims, 3 Drawing Sheets

(56)        References Cited

FOREIGN PATENT DOCUMENTS

| | | | | |
|---|---|---|---|---|
| CN | 113686506 A | * | 11/2021 | .............. G01M 3/04 |
| CN | 113740054 A | * | 12/2021 | .......... G01M 13/005 |
| CN | 113848138 A | * | 12/2021 | .............. G01N 3/02 |
| CN | 218934918 U | | 4/2023 | |

* cited by examiner

PERFORMANCE TESTING DEVICE FOR PISTON ROD SEALING ASSEMBLY

CROSS-REFERENCE TO RELATED APPLICATIONS

The application claims priority to Chinese Patent Application No. 2023107224093, filed on Jun. 16, 2023, which is hereby incorporated by reference in its entirety.

TECHNICAL FIELD

Embodiments of the present application relates to the technical field of piston rod sealing testing, and in particular, relates to a performance testing device for a piston rod sealing assembly.

BACKGROUND

Reciprocating sealing, as a typical type of sealing, is a key technology in many industrial fields, especially in high-tech fields such as aerospace and other industries. The level of the reciprocating sealing performance directly affects the reliability, stability, and service life of a machine device, and the failure of the reciprocating sealing often directly affects a normal operation of the device and even causes huge property losses and serious safety accidents. Therefore, it is of great significance to test and verify the reciprocating sealing performance.

In relevant technologies, a hydraulic cylinder includes a cylinder body, a piston rod, and a sealing assembly, where the sealing assembly is sleeved on the piston rod, the piston rod passes through and is provided in the cylinder body and the sealing assembly is located between the cylinder body and the piston rod to seal between the two ends of the cylinder body and the piston rod. The sealing performance, friction force and other properties of the sealing assembly will affect the performance of the hydraulic cylinder.

However, there is no device in relevant technologies that can test the performance of the sealing assembly under various operating conditions.

SUMMARY

In view of this, a main object of embodiments of the present application is to provide a performance testing device for a piston rod sealing assembly, in order to solve the technical problem of how to test the performance of the sealing assembly under various operating conditions.

To achieve the above object, an embodiment of the present application provides a performance testing device for a piston rod sealing assembly, including a bracket, a support apparatus, a drive apparatus, and a leakage detection apparatus, where the support apparatus includes a cylinder body, the cylinder body is internally provided with a channel inside the cylinder body, and the channel inside the cylinder body is configured to allow a piston rod equipped with a sealing component to pass therethrough; the drive apparatus is arranged on the bracket, and the drive apparatus is configured to be connected with the piston rod and drive the piston rod to reciprocate along an axis of the channel inside the cylinder body; the leakage detection apparatus includes a limit member and an oil receiver, the limit member is provided with a detection channel and an oil channel, the limit member is connected to the cylinder body, the detection channel is communicated with the channel inside the cylinder body, and a diameter of the detection channel is smaller than a diameter of the channel inside the cylinder body, the detection channel is configured to allow the piston rod to pass therethrough; and one end of the oil channel is communicated with the detection channel, and the other end thereof is communicated with the oil receiver.

In some embodiments that may include the above embodiment, the drive apparatus includes a driving motor, a first rotating wheel, a first connecting rod, a first supporting seat, and a first guiding shaft, where the driving motor and the first supporting seat are arranged on the bracket, the first rotating wheel is connected to a motor shaft of the driving motor, and rotates with the motor shaft, one end of the first connecting rod is hinged with the first rotating wheel, and the other end thereof is hinged with the first guiding shaft, the first supporting seat is provided with a limit channel, and the limit channel is collinear with the axis of the channel inside the cylinder body, the first guiding shaft passes through and is provided in the limit channel, and the first guiding shaft is configured to be connected with the piston rod.

In some embodiments that may include the above embodiment, a tension detection apparatus is further included, and the tension detection apparatus is configured to be arranged between the first guiding shaft and the piston rod.

In some embodiments that may include the above embodiment, a balance apparatus is further included, and the balance apparatus includes a second rotating wheel, a second connecting rod, a second guiding shaft, and a counterweight block, where the second rotating wheel is rotatably arranged relative to the bracket, and the second rotating wheel and the first rotating wheel are in transmission connection and have the same rotation direction, one end of the second connecting rod is hinged with the second rotating wheel, and the other end thereof is hinged with the second guiding shaft, the second guiding shaft is slidably arranged relative to the bracket, and the counterweight block is arranged on an end of the second guiding shaft away from the second connecting rod.

In some embodiments that may include the above embodiments, the balance apparatus further includes a first synchronous wheel, a second synchronous wheel, and a synchronous belt, where the first synchronous wheel is connected to the motor shaft and rotates with the motor shaft; the second synchronous wheel is connected to the second rotating wheel and rotates with the second rotating wheel; and the synchronous belt is circled around the first synchronous wheel and the second synchronous wheel.

In some embodiments that may include the above embodiments, a temperature control apparatus is further included, the temperature control apparatus includes a high-low temperature test chamber, and the support apparatus and leakage detection apparatus are both arranged in the high-low temperature test chamber.

In some embodiments that may include the above embodiments, a hydraulic control apparatus is further included, and the hydraulic control apparatus includes an oil tank and an oil pump, where the oil pump is provided with an oil inlet and an oil outlet, the oil inlet is communicated with the oil tank. The cylinder body is provided with an oil inlet channel and an oil return channel, the oil inlet channel and the oil return channel are communicated to the channel inside the cylinder body. The oil inlet channel is also communicated with the oil outlet, and the oil return channel is also communicated with the oil tank.

In some embodiments that may include the above embodiments, a pressure detection apparatus and a main control apparatus are further included, the pressure detection apparatus is configured to detect a pressure of a hydraulic oil in at least one of the channel inside the cylinder body, the oil inlet channel, and the oil return channel, and both the pressure detection apparatus and the hydraulic control apparatus are electrically connected to the main control apparatus.

In some embodiments that may include the above embodiments, a vibration generation apparatus is further included, the vibration generation apparatus is arrange on bottom of the high-low temperature test chamber, and a vibration output end of the vibration generation apparatus runs through the bottom of the high-low temperature test chamber and is connected to the support apparatus. A flexible member is arranged in the gap between the vibration output end and the high-low temperature test chamber, and the flexible member forms sealing between the vibration output end and the high-low temperature test chamber.

In some embodiments that may include the above embodiments, a displacement detection apparatus and a displacement reference member are further included, where the displacement reference member is configured to be connected with the piston rod, the displacement detection apparatus is arranged on the bracket, and the displacement detection apparatus corresponds to the displacement reference member so as to detect a displacement of the displacement reference member.

According to the performance testing device for the piston rod sealing assembly provided the embodiments of the present application, when testing the piston rod sealing assembly, a space located outside the piston rod in the channel inside the cylinder body may be filled with a hydraulic oil, and the drive apparatus drives the piston rod to reciprocate along an axis of the piston rod itself. During this process, due to a difference in the sealing performance of the sealing components, a portion of the hydraulic oil may flow out from a gap between the sealing component and the piston rod to reach between the detection channel and the piston rod, and then flow from the oil channel to the oil receiver. The sealing performance of the sealing component is negatively correlated with an amount of the hydraulic oil leaked, and the sealing performance of the sealing component is reflected according to an amount of the hydraulic oil in the oil receiver. The drive apparatus enables a linear speed of the piston rod to be adjustable during reciprocating movement; the hydraulic control apparatus enables a pressure in the test cylinder body to be adjustable; the high-low temperature test chamber enables a temperature of the test sealing environment to be adjustable; the vibration generation apparatus enables the vibration frequency and acceleration of the testing system to be adjustable, so that the sealing performance of the piston rod sealing assembly may be tested or verified under various operating conditions.

BRIEF DESCRIPTION OF THE DRAWINGS

In order to more clearly explain the technical solution in the embodiments of the present application or the prior art, a brief introduction will be given to the accompanying figures needed in the specification of the embodiments or the prior art. It is obvious that the accompanying figures in the following description are some embodiments of the present application. For an ordinary skilled in the art, other accompanying figures can be obtained based on these figures without any creative effort.

DESCRIPTION OF REFERENCE SIGNS

Figure 1:
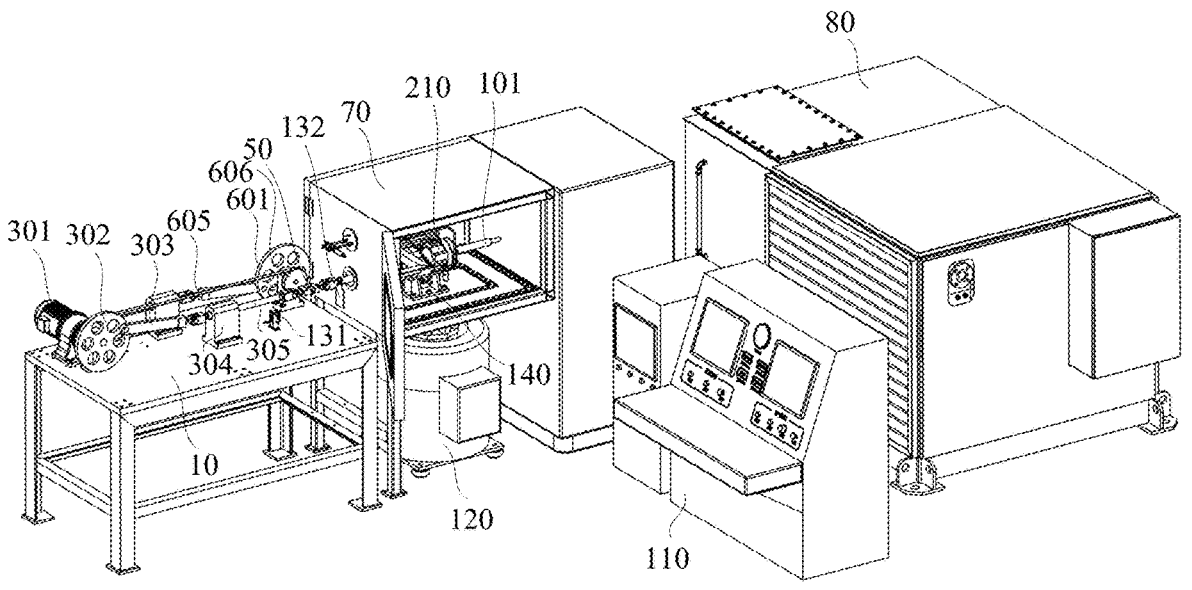
FIG. 1 is a schematic diagram of a structure of a performance testing device for a piston rod sealing assembly provided in an embodiment of the present application.

101. piston rod; 102. sealing component;
10. bracket;
210. cylinder body; 211. channel inside the cylinder body; 212. oil inlet channel; 213. oil return channel;
301. driving motor; 302. first rotating wheel; 303. first connecting rod; 304. first supporting seat; 305. first guiding shaft; 306. first synchronous wheel;
400. leakage detection apparatus;
410. limit member; 411. oil channel; 412. oil scraper ring; 413. detection channel;
420. oil receiver;
50. tension detection apparatus;
601. second rotating wheel; 602. second connecting rod; 603. second guiding shaft; 604. counterweight block; 605. synchronous belt; 606. second synchronous wheel;
70. high-low temperature test chamber;
80. hydraulic control apparatus;
90. pressure detection apparatus;
100. temperature detection apparatus;
110. main control apparatus;
120. vibration generation apparatus;
131. displacement detection apparatus; 132. displacement reference member;
140. support apparatus.

DESCRIPTION OF EMBODIMENTS

Firstly, those skilled in the art should understand that these implementations are only used to explain the technical principle of the present application and are not intended to limit the protection scope of the present application. Those skilled in the art can make adjustments as needed to adapt to specific applications.

Secondly, it should be noted that in the description of the embodiments of the present application, the terms "inside", "outside", etc., indicating the direction or position relationship, are based on the direction or position relationship shown in the accompanying figures. This is only for the convenience of description, not to indicate or imply that the mentioned apparatus or member must have a specific orientation, be configured and operated in a specific orientation, and therefore cannot be understood as a limitation of the present application.

In addition, it should be noted that in the description of the embodiments of the present application, unless otherwise specified and limited, the terms "connected to" and "connected with" should be understood broadly, for example, they may refer to a fixed connection, may also refer to a detachable or one-piece connection; may refer to a mechanical or electrical connection; may also refer to a direct connection or indirect connection via through an intermediate media and may also refer to an inner communication of two components. For those skilled in the art, the specific meanings of the above terms in the embodiments of the present application can be understood according to specific situations.

In order to make the objects, technical solutions and advantages of the embodiments of the present application more clear, the technical solutions in the embodiments of the present application are clearly and completely described in conjunction with the accompanying figures. It is evident that the described embodiments are some of the embodiments of the present application, not all of them. All other embodiments obtained by an ordinary skilled in the art based on the embodiments of the present application without creative efforts shall belong to the protection scope of the present application.

As discussed in the background, there is no device in relevant technologies that can test the performance of the sealing assembly under various operating conditions. After research by the inventor, it was found that the reason for this problem is that the sealing performance, friction force and the like of the piston rod sealing assembly are affected by a variety of factors, but the testing device in the relevant technologies can only test the performance of the sealing assembly under a single operating condition. The resulting test data cannot accurately reflect the performance of the sealing assembly and the product quality, resulting in the instability of the performance of the sealing assembly in practical applications, affecting the reliability, stability and service life of the used machine device.

In view of the above technical problem, an embodiment of the present application provides a performance testing device for a piston rod sealing assembly, where the device drives a piston rod to perform a linear reciprocating movement through a drive apparatus, an oil receiver receives a hydraulic oil leaked between the piston rod and a sealing component during the reciprocating movement of the piston rod, and the sealing performance of the sealing component is negatively correlated with an amount of the hydraulic oil leaked, and the sealing performance of the sealing component is reflected by the amount of the hydraulic oil leaked, the drive apparatus enables a linear speed of the piston rod to be adjustable; a hydraulic control apparatus enables a pressure in a test cylinder body to be adjustable; a high-low temperature test chamber enables a temperature of a testing sealing environment to be adjustable; a vibration generation apparatus enables vibration frequency and acceleration of a testing system to be adjustable, so that the sealing performance of the piston rod sealing assembly may be tested or verified under various operating conditions.

In addition, considering that the drive apparatus is prone to producing an additional vibration caused by an impact force at high speed, the balance apparatus adopts a symmetrical design to achieve dynamic balance of the drive apparatus. In order to avoid air leakage at a connection position between the vibration generation apparatus and the cylinder body from affecting the temperature control effect of the high-low temperature test chamber, a flexible member is used to seal the connection position, and meanwhile the flexible member will not transmit the vibration at the connection position to the high-low temperature test chamber, so as to avoid the impact of the vibration on the strength and function of the high-low temperature test chamber.

The following is a description of the principles and features of the embodiments of the present application in conjunction with the accompanying figures. The examples provided are only intended to explain the embodiments of the present application and are not intended to limit the scope of the embodiments of the present application.

The embodiments provide a performance testing device for a piston rod sealing assembly, the device being used to test the performance of the piston rod sealing assembly, where the piston rod sealing assembly includes a piston rod and a sealing component, the sealing component is sleeved on the periphery of the piston rod, and the sealing component abuts against the piston rod, so as to prevent the hydraulic oil from flowing out along an outer wall of the piston rod during the reciprocating movement of the piston rod in actual use.

Figure 2:
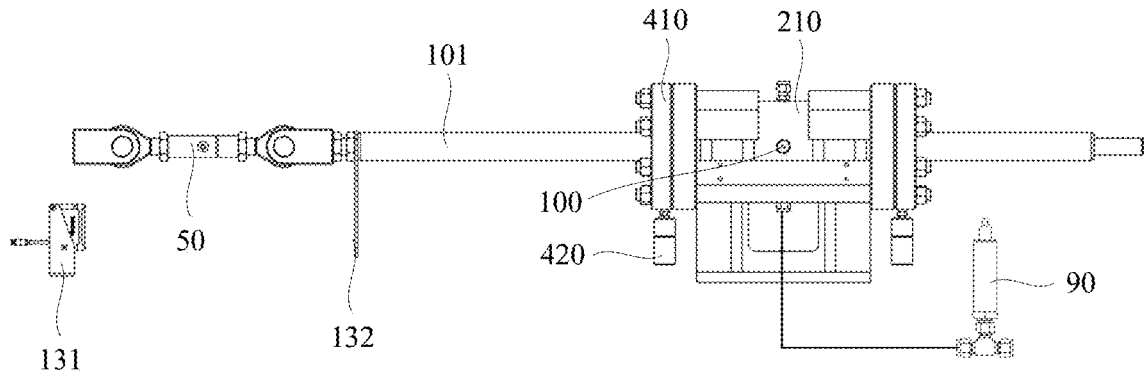
FIG. 2 is a schematic diagram of partial structure of a performance testing device for a piston rod sealing assembly provided in an embodiment of the present application.
Figure 3:
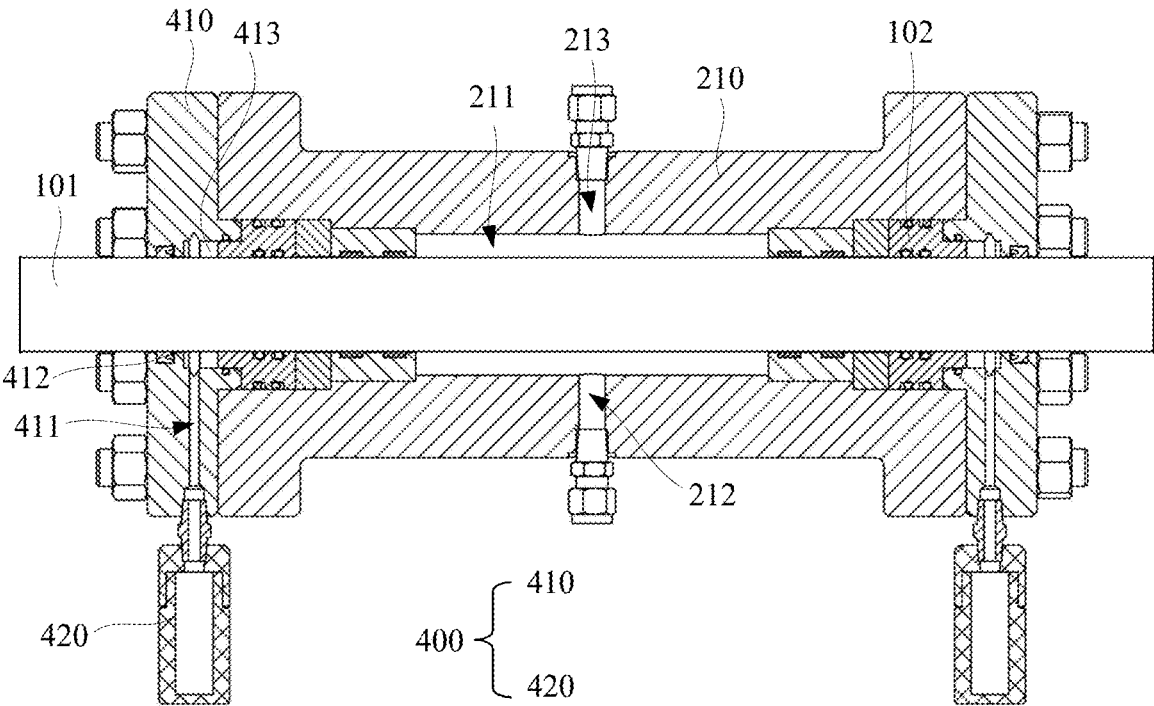
FIG. 3 is a partial cross-sectional view of a performance testing device for a piston rod sealing assembly provided in an embodiment of the present application.
Figure 4:
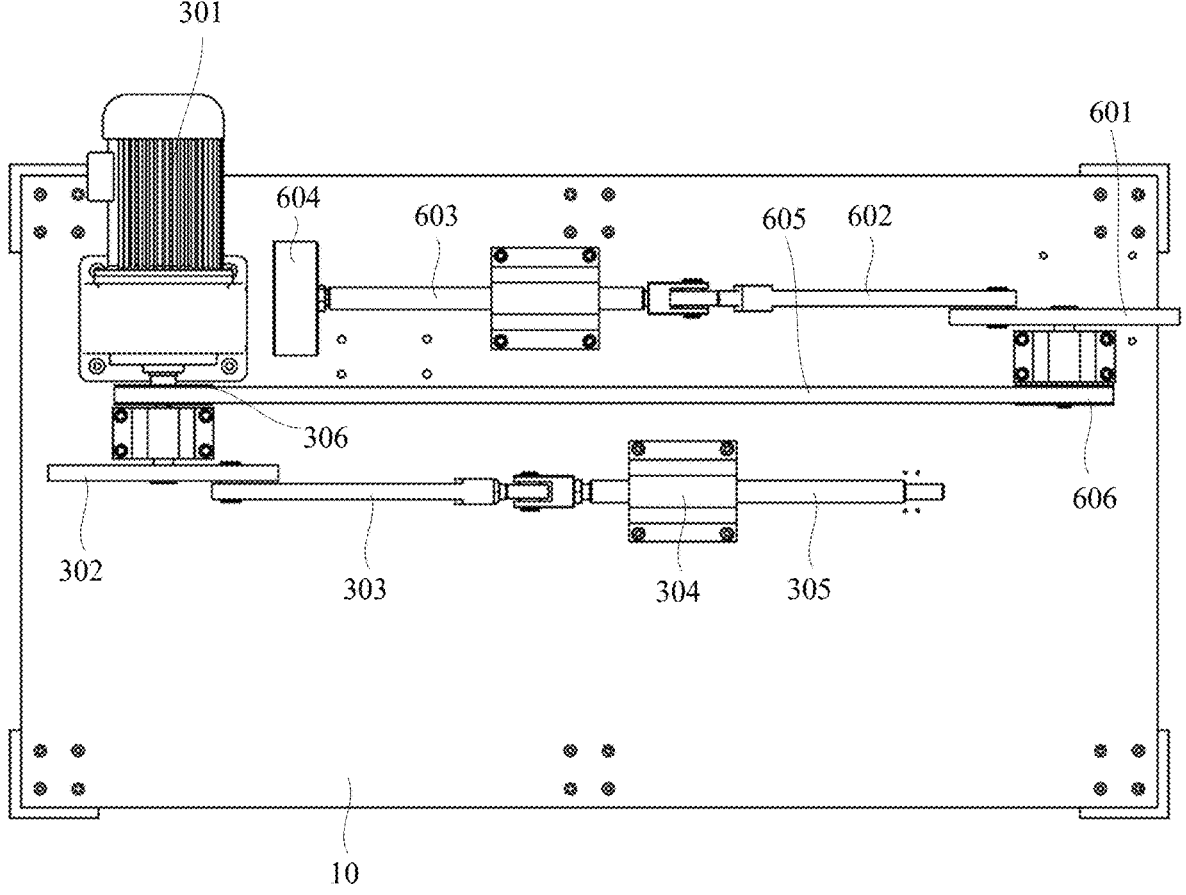
FIG. 4 is a schematic diagram of structures of a drive apparatus and a balance apparatus in a performance testing device for a piston rod sealing assembly provided in an embodiment of the present application.

Referring to FIGS. 1 to 3, the performance testing device for the piston rod sealing assembly provided in the present embodiment includes a bracket 10, a support apparatus 140, a drive apparatus, and a leakage detection apparatus 400, where the support apparatus 140 includes a cylinder body 210, the cylinder body is internally provided with a channel inside the cylinder body 211, and the channel inside the cylinder body 211 is used for allowing the piston rod sealing assembly to pass therethrough, and the channel inside the cylinder body 211 may extend along a horizontal direction so that the piston rod 101 may reciprocate along the horizontal direction during testing, so as to enable the tested piston rod sealing assembly to be closer to the direction of movement in actual use.

The leakage detection apparatus 400 includes a limit member 410 and an oil receiver 420. The limit member 410 may include such as a flange, and the limit member 410 is provided with a detection channel 413 and an oil channel 411, where an axis of the detection channel 413 is collinear with that of the channel inside the cylinder body 211, a diameter of the detection channel 413 is smaller than that of the channel inside the cylinder body 211, the limit member 410 is detachably connected to the cylinder body 210, and the detection channel 413 is in communication with the channel inside the cylinder body 211. When testing the piston rod sealing assembly, the piston rod sealing assembly passes through and is provided in the channel inside the cylinder body 211, and the periphery of the sealing component 102 abuts against a side wall of the channel inside the cylinder body 211, so as to perform sealing between the piston rod 101 and the cylinder body 210. The limit member 410 stops at an end face of an end of the sealing component 102 along the axis of the piston rod 101, so as to limit the degree of freedom of the sealing component 102 along the axial direction of the piston rod 101, so that the sealing component 102 does not move along with the piston rod 101 during the process of reciprocating movement of the piston rod 101.

An inner wall of the detection channel 413 is provided with a fixing groove in a circular shape, and an axis of the fixing groove is collinear with an axis of the detection channel 413. The fixing groove is further away from the cylinder body 210 than the oil channel 411. The leakage detection apparatus 400 may further include an oil scraper ring 412, and the oil scraper ring 412 is arranged in the fixing groove. The oil scraper ring 412 may scrape off the viscous hydraulic oil on the piston rod 101 to enable the hydraulic oil to flow toward the oil channel 411.

The oil channel 411 may be located at the bottom of the detection channel 413, and a top end of the oil channel 411 is communicated with the detection channel 413, and a bottom end thereof is communicated with the oil receiver 420. The oil receiver 420 may receive the hydraulic oil flowing from the oil channel 411.

Specifically, the bottom end of the oil channel 411 may have internal threads, a connecting end of the oil receiver 420 may have external threads, and the oil receiver 420 may be threaded to the oil channel 411.

The drive apparatus is arranged on the bracket 10, the drive apparatus is used to connect with the piston rod 101 and drive the piston rod 101 to reciprocate along the axis of the channel inside the cylinder body 211.

According to the performance testing device for the piston rod sealing assembly in the present embodiment, when testing the piston rod sealing assembly, a space outside the piston rod 101 and within the channel inside the cylinder body 211 may be filled with the hydraulic oil, and the drive apparatus drives the piston rod to reciprocate along its own axis. During this process, due to difference in the sealing performance of the sealing components 102, part of the hydraulic oil may flow out from a gap between the sealing component 102 and the piston rod 101 to reach between the detection channel 413 and the piston rod, and then flow from the oil channel 411 to the oil receiver 420. The sealing performance of the sealing component 102 is negatively correlated with an amount of the hydraulic oil leaked, and the sealing performance of the sealing component 102 is reflected according to the amount of the hydraulic oil in the oil receiver 420. The drive apparatus enables the linear speed of the piston rod to be adjustable during reciprocating movement, so that the sealing performance of the piston rod sealing assembly may be tested or verified at various linear speeds.

Referring to FIGS. 1 to 4, the above-mentioned drive apparatus may include a driving motor 301, a first rotating wheel 302, a first connecting rod 303, a first supporting seat 304, and a first guiding shaft 305. The driving motor 301 and the first supporting seat 304 are arranged on the bracket 10. The first rotating wheel 302 is connected to a motor shaft of the driving motor 301, and rotates with the motor shaft. One end of the first connecting rod 303 is hinged with the first rotating wheel 302, specifically, the first connecting rod 303 and the first rotating wheel 302 can be connected through a first rotating shaft, and an axis of the first rotating shaft is parallel to an axis of the motor shaft and spaced apart. The first rotating shaft passes through and is provided in the first connecting rod 303 and the first rotating wheel 302, and the first rotating wheel 302 drives one end of the first connecting rod 303 to make circular movement around the axis of the motor shaft during rotation. The other end of the first connecting rod 303 is hinged with the first guiding shaft 305. The first connecting rod 303 and the first guiding shaft 305 can be connected through a second rotating shaft, and an axis of the second rotating shaft is parallel to the axis of the first rotating shaft. The second rotating shaft passes through and is provided in the first connecting rod 303 and the first guiding shaft 305, so that the first connecting rod 303 can rotate relative to the first guiding shaft 305 around the axis of the second rotating shaft. The first supporting seat 304 is provided with a limit channel, and the limit channel is collinear with an axis of the channel inside the cylinder body 211. The first guiding shaft 305 passes through and is provided in the limit channel, and the first guiding shaft 305 is used to connect with the piston rod 101.

When the driving motor 301 operates, the motor shaft rotates to drive the first rotating wheel 302 to rotate, and then drive an end of the first connecting rod 303 close to the first rotating wheel 302 to make a circular movement with the axis of the motor shaft as a center. Since the first guiding shaft 305 passes through and is provided in the limit channel, the first guiding shaft 305 can only move in a straight line along the limit channel. An end of the first connecting rod 303 away from the first rotating shaft is connected with the first guiding shaft 305, and thus when one end of the first connecting rod 303 makes a circular movement with the axis of the motor shaft as the center, the other end of the first connecting rod 303 may only make a linear reciprocating movement along an axis direction of the first guiding shaft 305, and thus drive the first guiding shaft 305 to make a linear reciprocating movement along an axis of the limit channel.

When testing the piston rod sealing assembly, an end of the first guiding shaft 305 away from the first connecting rod 303 is connected to the piston rod 101, and the axis of the first guiding shaft 305 is collinear with the axis of the piston rod 101 to drive the piston rod 101 to perform a linear reciprocating movement with its own axis as the center.

A linear speed of the piston rod 101 can be changed by changing a rotation speed of the driving motor 301, and the greater the rotation speed of the driving motor 301, the greater the linear speed of the piston rod 101, so that the sealing performance of the piston rod sealing assembly may be tested or verified at various linear speeds.

Furthermore, the performance testing device for the piston rod sealing assembly may further include a balance apparatus, and the balance apparatus may include a second rotating wheel 601, a second connecting rod 602, a second guiding shaft 603 and a counterweight block 604. The second rotating wheel 601 is rotationally disposed relative to the bracket 10. The bracket 10 may be provided with a second supporting seat, and the second supporting seat may be provided with a rotating shaft, and the rotating shaft may rotate relative to the second supporting seat with its own axis as the center. The second rotating wheel 601 is connected to the rotating shaft and rotates with the rotating shaft, and the second rotating wheel 601 and the first rotating wheel 302 are in transmission connection and rotate in the same direction. Exemplarily, the balance apparatus may further include a first synchronous wheel 306, a second synchronous wheel 606, and a synchronous belt 605, where the first synchronous wheel 306 is connected to the motor shaft and rotates with the motor shaft, the second synchronous wheel 606 is connected to the second rotating wheel 601 and rotates with the second rotating wheel 601, the synchronous belt 605 is circled around the first synchronous wheel 306 and the second synchronous wheel 606 so that the second rotating wheel 601 and the first rotating wheel 302 may achieve synchronous rotation. The first synchronous wheel 306 and the second synchronous wheel 606 have the same specification, and the first rotating wheel 302 and the second rotating wheel 601 also have the same specification, so that the paths of the first guiding shaft 305 and the second guiding shaft 603 during the reciprocating movement correspond to each other, that is, when the first guiding shaft 305 moves towards the first rotating wheel 302, the second guiding shaft 603 moves towards the second rotating wheel 601, and when the first guiding shaft 305 moves away from the first rotating wheel 302, the second guiding shaft 603 moves away from the second rotating wheel 601, so as to achieve a better vibration reduction effect.

One end of the second connecting rod 602 is connected to the second rotating wheel 601, and the other end thereof is connected to the second guiding shaft 603. The second guiding shaft 603 is slidably arranged relative to the bracket 10, and the counterweight block 604 is provided on an end of the second guiding shaft 603 away from the second connecting rod 602.

When the driving motor 301 operates, the first rotating wheel 302 rotates to drive the piston rod 101 to perform a linear reciprocating movement, and at this time, since the second rotating wheel 601 is in transmission connection with the first rotating wheel 302, the second rotating wheel 601 also rotates synchronously with the first rotating wheel 302. One end of the second connecting rod 602 is hinged to the second rotating wheel 601, specifically, the second connecting rod 602 and the second rotating wheel 601 may be connected by a third rotating shaft, and an axis of the third rotating shaft is parallel to the axis of the second rotating wheel 601 and spaced apart. The third rotating shaft passes through and is provided in the second connecting rod 602 and the second rotating wheel 601. The second rotating wheel 601 drives one end of the second connecting rod 602 to perform a circular movement with the axis of the second rotating wheel 601 as the center during rotation. The other end of the second connecting rod 602 is hinged with the second guiding shaft 603, and the second connecting rod 602 and the second guiding shaft 603 may be connected by a fourth rotating shaft. An axis of the fourth rotating shaft is parallel to the axis of the third rotating shaft. The fourth rotating shaft passes through and is provided in the second connecting rod 602 and the second guiding shaft 603 so that the second connecting rod 602 may rotate relative to the second guiding shaft 603 with the axis of the fourth rotating shaft as the center.

The bracket 10 may further be provided with a third supporting seat, and the axis of the second guiding shaft 603 is parallel to the axis of the first guiding shaft 305. The second guiding shaft 603 passes through and is provided in the third supporting seat, and the second guiding shaft 603 is slidable relative to the third supporting seat. The counterweight block 604 is provided at an end of the second guiding shaft 603 away from the second connecting rod 602, and the counterweight block 604 exerts a downward pulling force on the second guiding shaft 603, so that vibrations of the second guiding shaft 603 and the second connecting rod 602 in a vertical direction are weakened, and thus the anisotropic vibration generated by the rotation of the second rotating wheel 601 is weakened. Furthermore since the first rotating wheel 302 is in transmission connection with the second rotating wheel 601, the anisotropic vibration generated by the rotation of the first rotating wheel 302 may also be weakened and ultimately vibrations of the first guiding shaft 305 and the piston rod 101 in the vertical direction may be weakened, so that the piston rod 101 is more stable when doing a linear reciprocating movement, and performance data obtained by testing is more accurate.

Referring to FIGS. 1 and 2, in some embodiments, the performance testing device for the piston rod sealing assembly may further include a tension detection apparatus 50, the tension detection apparatus 50 is connected to an end of the first guiding shaft 305 away from the first connecting rod 303. When testing the piston rod sealing assembly, the tension detection apparatus 50 is connected between the first guiding shaft 305 and the piston rod 101 to measure the friction force during the reciprocating movement of the piston rod 101.

The tension detection apparatus 50 may include a tension sensor or other apparatus that can detect tension. Both ends of the tension sensor can be each mounted with a joint bearing and pulled with the first guiding shaft 305 and the piston rod 101 through an adapter, respectively, to measure the friction force during reciprocating movement of the piston rod 101.

The friction force of the piston rod sealing assembly during the reciprocating movement of the piston rod 101 is also an important parameter reflecting the performance of the sealing component 102. The smaller the friction force between the sealing component 102 and the piston rod 101, the better. If the friction force of the sealing component 102 is too large, it will hinder the movement of the piston rod 101.

Referring to FIG. 1, in some embodiments, the performance testing device for the piston rod sealing assembly may further include a hydraulic control apparatus 80, and the hydraulic control apparatus 80 includes an oil tank and an oil pump. The oil pump is provided with an oil inlet and an oil outlet, and the oil inlet is communicated with the oil tank.

Referring to FIG. 3, the cylinder body 210 may be provided with an oil inlet channel 212 and an oil return channel 213, and both of the oil inlet channel 212 and the oil return channel 213 are connected to the channel inside the cylinder body 211. The oil inlet channel 212 is also communicated with the oil outlet, and the oil return channel 213 is also communicated with the oil tank.

When testing the piston rod sealing assembly, the oil pump operates to transfer the hydraulic oil in the oil tank from the oil outlet and the oil inlet channel 212 to the channel inside the cylinder body 211 sequentially, and to return the hydraulic oil in the channel inside the cylinder body 211 from the oil return channel 213 and the oil inlet to the oil tank sequentially.

The pressure of the hydraulic oil in the channel inside the cylinder body 211 can be changed by adjusting the flow rate of the oil pump, so that the sealing performance and the friction force of the sealing component 102 on the piston rod 101 can be measured under a variety of different hydraulic pressures.

Referring to FIGS. 1 an 2, further, the performance testing device for the piston rod sealing assembly may further include a pressure detection apparatus 90 and a main control apparatus 110. The pressure detection apparatus 90 is configured to detect the pressure of the hydraulic oil in at least one of the channel inside the cylinder body 211, the oil inlet channel 212, and the oil return channel 213, and the pressure detection apparatus 90 may include an apparatus that can detect pressure, such as a pressure sensor. Both the pressure detection apparatus 90 and the hydraulic control apparatus 80 are electrically connected to the main control apparatus 110. The main control apparatus 110 may adjust the hydraulic control apparatus 80 according to the pressure measured by the pressure detection apparatus 90, so that the pressure of the hydraulic oil in the channel inside the cylinder body 211 meets a preset pressure required for testing.

The hydraulic control apparatus 80 may adjust a temperature of the hydraulic oil in addition to the pressure of the hydraulic oil. The cylinder body 210 may further be provided with a temperature sensor, the temperature sensor may detect a temperature of the hydraulic oil in at least one of the channel inside the cylinder body 211, the oil inlet channel 212 and the oil return channel 213, and the temperature sensor is also electrically connected to the main control apparatus 110. The main control apparatus 110 may adjust the hydraulic control apparatus 80 according to the temperature measured by the temperature sensor, so that the temperature of the hydraulic oil in the channel inside the cylinder body 211 meets a preset temperature required for testing.

In some embodiments, the performance testing device for the piston rod sealing assembly may further include a temperature control apparatus. Referring to FIG. 1, the temperature control apparatus includes a high-low temperature test chamber 70, and the support apparatus 140 and the leakage detection apparatus 400 are both arranged in the high-low temperature test chamber 70. The cylinder body 210 may be fixed to the high-low temperature test chamber 70 through a cylinder body base seat and a cylinder body press seat, where the cylinder body base seat is arranged on the high-low temperature test chamber 70, and the cylinder body base seat and the cylinder body press seat may detachably are provided around the periphery of the cylinder body 210. The temperature of the environment where the piston rod 101 and the sealing component 102 are located can be changed by adjusting the temperature of the high-low temperature test chamber 70. Therefore, the sealing performance and the friction force of the sealing component 102 against the piston rod 101 may be measured at various environmental temperatures.

Referring to FIG. 1, in some embodiments, the performance testing device for the piston rod sealing assembly may further include a vibration generation apparatus 120, the vibration generation apparatus 120 may include a vibration exciter or other apparatus capable of generating vibration. The vibration generation apparatus 120 has a vibration output end, and the vibration output end runs through the bottom of the high-low temperature test chamber 70 and is connected with the support apparatus 140 to drive the cylinder body 210 to vibrate, so as to test the performance of the piston rod sealing assembly in a vibration environment.

There is a gap between the vibration output end and the high-low temperature test chamber 70, and a flexible member is provided in the gap. The flexible member may include, for example, a silicone member or a rubber member, and the flexible member forms sealing between the vibration output end and the high-low temperature test chamber 70, so as to avoid air leakage at a connection position between the vibration generation apparatus 120 and the cylinder body 210 from affecting the temperature control effect of the high-low temperature test chamber 70, and meanwhile, the flexible member does not transmit the vibration at the connecting position to the high-low temperature test chamber 70, avoiding the impact of vibration on the strength and function of the high-low temperature test chamber 70.

In an implementation where the performance testing device for the piston rod sealing assembly includes the high-low temperature test chamber 70, the support apparatus 140 and the leakage detection apparatus 400 may be arranged on the bottom of the high-low temperature test chamber 70, and the vibration generation apparatus 120 may be connected to the bottom of the chamber, so as to drive the cylinder body 210, the piston rod 101, and the sealing component 102 to vibrate.

Referring to FIGS. 1 and 2, in some embodiments, the performance testing device for the piston rod sealing assembly may further include a displacement detection apparatus 131 and a displacement reference member 132. The displacement reference member 132 may include, for example, a displacement reference plate or a displacement reference block. When testing the piston rod sealing assembly, the displacement reference member 132 is used to connect with the piston rod 101, and the displacement reference member 132 moves synchronously with the piston rod 101. The displacement detection apparatus 131 may include a displacement sensor or other apparatus that can detect the displacement of the displacement reference member 132. The displacement detection apparatus 131 is arranged on the bracket 10, and the displacement detection apparatus 131 corresponds to the displacement reference member 132 to detect the displacement of the displacement reference member 132. The displacement of the piston rod 101 is determined according to the displacement of the displacement reference member 132, and an actual linear speed of the piston rod 101 is then determined. The drive apparatus is adjusted according to the actual linear speed so that the actual linear speed of the piston rod 101 is close to a preset linear speed required for testing.

The hydraulic control apparatus 80, the temperature detection apparatus 100, the pressure detection apparatus 90, the driving motor 301, the displacement detection apparatus 131, the tension detection apparatus 50, the vibration generation apparatus 120 and the temperature control apparatus in the above embodiments may all be electrically connected to the main control apparatus 110, the main control apparatus 110 controls command output of the driving motor 301 and the hydraulic control apparatus 80; data collecting, processing, displaying, and report output of the displacement detection apparatus 131, the tension detection apparatus 50, the temperature detection apparatus 100 and the pressure detection apparatus 90; excitation output and report output of the vibration generation apparatus 120; and command output, status display, and report output of the temperature control apparatus.

According to the performance testing device for the piston rod sealing assembly in this embodiment, the drive apparatus enables the linear speed of the piston rod to be adjustable; the high-low temperature test chamber 70 enables the temperature of the sealing environment for testing to be adjustable; the vibration generation apparatus 120 enables the vibration frequency and acceleration of the testing system to be adjustable. Thus the sealing performance of the piston rod sealing assembly may be tested or verified under various operating conditions, the sealing performance and friction force of the piston rod sealing assembly can be tested under severe operating conditions based on various comprehensive factors such as adjustable ultra-high speed, high pressure, wide temperature range and vibration, the severe operating condition testing based on a variety of variable environmental factors can be realized, and the testing of piston rods 101 and sealing assemblies of various specifications can be realized. The balance apparatus may effectively reduce high-speed rotational vibration; the vibration generation apparatus 120 and the high-low temperature test chamber 70 are effectively combined to achieve vibration-temperature synchronous adjustment and controlling, and the oil receivers 420 may facilitate observation and measurement of leakage of the hydraulic oil during a reciprocating movement of the piston rod 101.

Finally, it should be noted that the aforementioned embodiments are merely used to illustrate the technical solutions of the present application rather than to limit the present application. Although the present application has been described in detail with reference to the aforementioned embodiments, it should be understood by those ordinary skilled in the art that they may still make modifications to the technical solutions described in the aforementioned embodiments, or make equivalent replacements of some or all technical features therein. These modifications or replacements do not make the essence of the corresponding technical solutions depart from the scope of the technical solutions of the embodiments of the present application.

What is claimed is:

1. A performance testing device for a piston rod sealing assembly, comprising a bracket, a support apparatus, a drive apparatus, and a leakage detection apparatus, and a balance apparatus, wherein the support apparatus comprises a cylinder body, the cylinder body is internally provided with a channel inside the cylinder body, and the channel inside the cylinder body is configured to allow a piston rod equipped with a sealing component to pass therethrough;

the drive apparatus is provided on the bracket, and the drive apparatus is configured to be connected with the piston rod and drive the piston rod to reciprocate along an axis of the channel inside the cylinder body;

the leakage detection apparatus comprises a limit member and an oil receiver, the limit member is provided with a detection channel and an oil channel, the limit member is connected to the cylinder body, the detection channel is communicated with the channel inside the cylinder body, and a diameter of the detection channel is smaller than a diameter of the channel inside the cylinder body, the detection channel is configured to allow the piston rod to pass therethrough; one end of the oil channel is communicated with the detection channel, and the other end thereof is communicated with the oil receiver;

wherein the drive apparatus comprises a driving motor, a first rotating wheel, a first connecting rod, a first supporting seat, and a first guiding shaft, and the balance apparatus comprises a second rotating wheel, a second connecting rod, a second guiding shaft, a counterweight block, and a synchronous belt;

wherein the first guiding shaft and the second guiding shaft are located on opposite sides of the synchronous belt and parallel to each other, the first guiding shaft is provided at one end of the first connecting rod away from the driving motor, while the second guiding shaft is provided at one end of the second connecting rod close to the driving motor, so that when the performance testing device for a piston rod sealing assembly operates, the first guiding shaft and the second guiding shaft move in opposite directions.

2. The performance testing device for a piston rod sealing assembly according to claim 1, wherein the driving motor and the first supporting seat are provided on the bracket, the first rotating wheel is connected to a motor shaft of the driving motor and rotates with the motor shaft, one end of the first connecting rod is hinged with the first rotating wheel and the other end thereof is hinged with the first guiding shaft, the first supporting seat is provided with a limit channel, the limit channel is collinear with the axis of the movable channel, the first guiding shaft passes through and is provided in the limit channel, and the first guiding shaft is configured to be connected with the piston rod.

3. The performance testing device for a piston rod sealing assembly according to claim 2, further comprising a tension detection apparatus, wherein the tension detection apparatus is configured to be provided between the first guiding shaft and the piston rod.

4. The performance testing device for a piston rod sealing assembly according to claim 2, wherein the second rotating wheel is rotatably provided relative to the bracket, and the second rotating wheel and the first rotating wheel are in transmission connection and have a same direction of rotation, one end of the second connecting rod is hinged with the second rotating wheel and the other end thereof is hinged with the second guiding shaft, the second guiding shaft is slidably provided relative to the bracket, and the counterweight block is provided at an end of the second guiding shaft away from the second connecting rod.

5. The performance testing device for a piston rod sealing assembly according to claim 4, wherein the balance apparatus further comprises a first synchronous wheel, a second synchronous wheel, wherein the first synchronous wheel is connected to the motor shaft and rotates with the motor shaft, the second synchronous wheel is connected to the second rotating wheel and rotates with the second rotating wheel, the synchronous belt is circled around the first synchronous wheel and the second synchronous wheel.

6. The performance testing device for a piston rod sealing assembly according to claim 1, further comprising a temperature control apparatus, wherein the temperature control apparatus comprises a high-low temperature test chamber, and the support apparatus and the leakage detection apparatus are both provided in the high-low temperature test chamber, and a temperature of an environment where the piston rod and the sealing component are located is changed by adjusting a temperature of the high-low temperature test chamber.

7. The performance testing device for a piston rod sealing assembly according to claim 2, further comprising a temperature control apparatus, wherein the temperature control apparatus comprises a high-low temperature test chamber, and the support apparatus and the leakage detection apparatus are both provided in the high-low temperature test chamber, and a temperature of an environment where the piston rod and the sealing component are located is changed by adjusting a temperature of the high-low temperature test chamber.

8. The performance testing device for a piston rod sealing assembly according to claim 3, further comprising a temperature control apparatus, wherein the temperature control apparatus comprises a high-low temperature test chamber, and the support apparatus and the leakage detection apparatus are both provided in the high-low temperature test chamber, and a temperature of an environment where the piston rod and the sealing component are located is changed by adjusting a temperature of the high-low temperature test chamber.

9. The performance testing device for a piston rod sealing assembly according to claim 4, further comprising a temperature control apparatus, wherein the temperature control apparatus comprises a high-low temperature test chamber, and the support apparatus and the leakage detection apparatus are both provided in the high-low temperature test chamber, and a temperature of an environment where the piston rod and the sealing component are located is changed by adjusting a temperature of the high-low temperature test chamber.

10. The performance testing device for a piston rod sealing assembly according to claim 5, further comprising a temperature control apparatus, wherein the temperature control apparatus comprises a high-low temperature test chamber, and the support apparatus and the leakage detection apparatus are both provided in the high-low temperature test chamber, and a temperature of an environment where the piston rod and the sealing component are located is changed by adjusting a temperature of the high-low temperature test chamber.

11. The performance testing device for a piston rod sealing assembly according to claim 1, further comprising a hydraulic control apparatus, wherein the hydraulic control apparatus comprises an oil tank and an oil pump, the oil pump is provided with an oil inlet and an oil outlet, and the oil inlet is communicated with the oil tank;

the cylinder body is provided with an oil inlet channel and an oil return channel, the oil inlet channel and the oil return channel are both communicated with the channel inside the cylinder body, the oil inlet channel is further communicated with the oil outlet, and the oil return channel is further communicated with the oil tank.

12. The performance testing device for a piston rod sealing assembly according to claim 2, further comprising a hydraulic control apparatus, wherein the hydraulic control apparatus comprises an oil tank and an oil pump, the oil pump is provided with an oil inlet and an oil outlet, and the oil inlet is communicated with the oil tank;

the cylinder body is provided with an oil inlet channel and an oil return channel, the oil inlet channel and the oil return channel are both communicated with the channel inside the cylinder body, the oil inlet channel is further communicated with the oil outlet, and the oil return channel is further communicated with the oil tank.

13. The performance testing device for a piston rod sealing assembly according to claim 3, further comprising a hydraulic control apparatus, wherein the hydraulic control apparatus comprises an oil tank and an oil pump, the oil pump is provided with an oil inlet and an oil outlet, and the oil inlet is communicated with the oil tank;

the cylinder body is provided with an oil inlet channel and an oil return channel, the oil inlet channel and the oil return channel are both communicated with the channel inside the cylinder body, the oil inlet channel is further communicated with the oil outlet, and the oil return channel is further communicated with the oil tank.

14. The performance testing device for a piston rod sealing assembly according to claim 4, further comprising a hydraulic control apparatus, wherein the hydraulic control apparatus comprises an oil tank and an oil pump, the oil pump is provided with an oil inlet and an oil outlet, and the oil inlet is communicated with the oil tank;

the cylinder body is provided with an oil inlet channel and an oil return channel, the oil inlet channel and the oil return channel are both communicated with the channel inside the cylinder body, the oil inlet channel is further communicated with the oil outlet, and the oil return channel is further communicated with the oil tank.

15. The performance testing device for a piston rod sealing assembly according to claim 5, further comprising a hydraulic control apparatus, wherein the hydraulic control apparatus comprises an oil tank and an oil pump, the oil pump is provided with an oil inlet and an oil outlet, and the oil inlet is communicated with the oil tank;

the cylinder body is provided with an oil inlet channel and an oil return channel, the oil inlet channel and the oil return channel are both communicated with the channel inside the cylinder body, the oil inlet channel is further communicated with the oil outlet, and the oil return channel is further communicated with the oil tank.

16. The performance testing device for a piston rod sealing assembly according to claim 11, further comprising a pressure detection apparatus and a main control apparatus, wherein the pressure detection apparatus is configured to detect a pressure of a hydraulic oil in at least one of the channel inside the cylinder body, the oil inlet channel and the oil return channel, and both the pressure detection apparatus and the hydraulic control apparatus are electrically connected to the main control apparatus.

17. The performance testing device for a piston rod sealing assembly according to claim 6, further comprising a vibration generation apparatus, wherein the vibration generation apparatus is provided at bottom of the high-low temperature test chamber, and a vibration output end of the vibration generation apparatus runs through the bottom of the high-low temperature test chamber and is connected to the support apparatus, a flexible member is provided in a gap between the vibration output end and the high-low temperature test chamber, and the flexible member forms sealing between the vibration output end and the high-low temperature test chamber.

18. The performance testing device for a piston rod sealing assembly according to claim 1, further comprising a displacement detection apparatus and a displacement reference member, wherein the displacement reference member is configured to be connected with the piston rod, the displacement detection apparatus is provided on the bracket, and the displacement detection apparatus corresponds to the displacement reference member so as to detect a displacement of the displacement reference member.

19. The performance testing device for a piston rod sealing assembly according to claim 2, further comprising a displacement detection apparatus and a displacement reference member, wherein the displacement reference member is configured to be connected with the piston rod, the displacement detection apparatus is provided on the bracket, and the displacement detection apparatus corresponds to the displacement reference member so as to detect a displacement of the displacement reference member.

20. The performance testing device for a piston rod sealing assembly according to claim 3, further comprising a displacement detection apparatus and a displacement reference member, wherein the displacement reference member is configured to be connected with the piston rod, the displacement detection apparatus is provided on the bracket, and the displacement detection apparatus corresponds to the displacement reference member so as to detect a displacement of the displacement reference member.

* * * * *